United States Patent
Kim et al.

(10) Patent No.: US 11,462,731 B2
(45) Date of Patent: Oct. 4, 2022

(54) LITHIUM METAL OXIDE, NEGATIVE ELECTRODE ACTIVE MATERIAL FOR LITHIUM SECONDARY BATTERY COMPRISING THE SAME, AND METHOD OF PREPARING THE SAME

(71) Applicants: LG Chem, Ltd., Seoul (KR); Dongguk University Industry-Academic Cooperation Foundation, Seoul (KR)

(72) Inventors: Ye Ri Kim, Daejeon (KR); Yong Mook Kang, Seoul (KR); Mi Ru Jo, Seoul (KR); Eun Kyung Kim, Daejeon (KR); Yong Ju Lee, Daejeon (KR); Rae Hwan Jo, Daejeon (KR)

(73) Assignees: Dongguk University Industry-Academic Cooperation Foundation; LG Energy Solution, Ltd.

( * ) Notice: Subject to any disclaimer, the term of this patent is extended or adjusted under 35 U.S.C. 154(b) by 358 days.

(21) Appl. No.: 16/739,538

(22) Filed: Jan. 10, 2020

(65) Prior Publication Data

US 2020/0220167 A1 Jul. 9, 2020

Related U.S. Application Data

(62) Division of application No. 15/548,318, filed as application No. PCT/KR2016/002419 on Mar. 10, 2016, now abandoned.

(30) Foreign Application Priority Data

Mar. 13, 2015 (KR) .......................... 10-2015-0035079

(51) Int. Cl.
| | | |
|---|---|---|
| H01M 4/36 | (2006.01) | |
| H01M 4/485 | (2010.01) | |
| H01M 4/525 | (2010.01) | |
| H01M 4/04 | (2006.01) | |
| H01M 10/052 | (2010.01) | |
| H01M 4/02 | (2006.01) | |

(52) U.S. Cl.
CPC ......... *H01M 4/366* (2013.01); *H01M 4/0402* (2013.01); *H01M 4/0471* (2013.01); *H01M 4/485* (2013.01); *H01M 4/525* (2013.01); *H01M 10/052* (2013.01); *H01M 2004/027* (2013.01); *Y02P 70/50* (2015.11)

(58) Field of Classification Search
CPC ......... H01M 10/052; H01M 2004/027; H01M 4/0402; H01M 4/0471; H01M 4/366; H01M 4/485; H01M 4/525
See application file for complete search history.

(56) References Cited

U.S. PATENT DOCUMENTS

| | | |
|---|---|---|
| 2007/0099086 A1 | 5/2007 | Kang et al. |
| 2010/0203388 A1 | 8/2010 | Kim et al. |
| 2014/0205898 A1 | 7/2014 | Lee et al. |

FOREIGN PATENT DOCUMENTS

| | | |
|---|---|---|
| CN | 101764209 A | 6/2010 |
| CN | 103337616 A | 10/2013 |
| KR | 100728783 B1 | 6/2007 |
| KR | 100889622 B1 | 3/2009 |
| KR | 20110079025 A | 7/2011 |
| KR | 20130055080 A | 5/2013 |
| KR | 20130140395 A | 12/2013 |
| KR | 20140093529 A | 7/2014 |

OTHER PUBLICATIONS

Search report from International Application No. PCT/KR2016/002419, dated Jun. 17, 2016.

*Primary Examiner* — Carlos Barcena
(74) *Attorney, Agent, or Firm* — Lerner, David, Littenberg, Krumholz & Mentlik, LLP

(57) ABSTRACT

A method of preparing a lithium metal oxide having a nickel oxide layer formed on a surface thereof includes (1) complexing a nickel precursor onto a surface of a lithium metal oxide; and (2) calcining, through a heat treatment, the lithium metal oxide—the surface of which is complexed with the nickel precursor—obtained in step (1).

8 Claims, 6 Drawing Sheets

LITHIUM METAL OXIDE, NEGATIVE ELECTRODE ACTIVE MATERIAL FOR
LITHIUM SECONDARY BATTERY
COMPRISING THE SAME, AND METHOD
OF PREPARING THE SAME

CROSS-REFERENCE TO RELATED APPLICATIONS

This application is a divisional of U.S. application Ser. No. 15/548,318, filed Aug. 2, 2017, which is a national phase entry under 35 U.S.C. § 371 of International Application No. PCT/KR2016/002419 filed Mar. 10, 2016, which claims priority from Korean Patent Application No. 2015-0035079, filed on Mar. 13, 2015, all of which are incorporated herein by reference.

TECHNICAL FIELD

The present invention relates to a lithium metal oxide, a negative electrode active material for a lithium secondary battery comprising the same, and a method of preparing the same, and more particularly, to a lithium metal oxide having enhanced electrochemical properties in a 1 V or lower voltage region, a negative electrode active material for a lithium secondary battery comprising the same, and a lithium metal oxide surface treatment method of preparing the same.

BACKGROUND ART

As technological development and demand for mobile devices has increased, the demand for secondary batteries as energy sources has increased rapidly, and among such secondary batteries, lithium secondary batteries, which exhibit high energy densities and operating potentials, long cycle lifetimes, and low self-discharge rates, have been commercialized and are thus, widely used.

In addition, due to recent increased interest in environmental issues, much research is being carried out on electric vehicles (EV) or hybrid electric vehicles (HEV), which can replace vehicles, such as gasoline-powered vehicles and diesel-powered vehicles, which are one of the main causes of air pollution.

Such electric vehicles (EV) and hybrid electric vehicles (HEV) and the like use nickel-metal hydride (Ni-MH) secondary batteries or lithium secondary batteries having high energy density, high discharge voltage, and output stability. When used in the electric vehicles, the lithium secondary batteries must have the properties of high energy density and the ability to generate a large output in a short amount of time, as well as the ability to be used for 10 or more years under harsh conditions, and thus are necessarily far superior to typical small-sized lithium batteries in terms of energy density, safety, and lifetime properties.

Typical lithium secondary batteries usually used as negative electrode active materials, carbon-based compounds capable of maintaining structural and electrical properties while enabling reversible intercalation and deintercalation of lithium ions. However, with the recent proliferation of electric vehicles, there has been increased research on the use of lithium metal oxides having fast charging speeds.

Such lithium metal oxides, having small particle sizes and large specific surface areas, are not only capable of high-speed charging and discharging, but have zero-strain properties, excellent lifetime properties, generate comparatively high levels of voltage, and are free of dendrites, and thus are known to be extremely safe and stable materials.

The easiest way to increase energy density using lithium metal oxides is to induce reactions near 0 V by expanding the voltage range in which lithium ions react. However, such an approach is limited in that non-reversible reactions may occur due to the formation of an interface (solid electrolyte interface, SEI) film that forms at or below 1 V. Up to the present, research on the interface film in lithium metal oxide has mostly been carried out at or above 1 V, and there have not been any reports about research considering voltages of 1 V or lower. Therefore, research on interface film formation in lithium metal oxides at or below 1 V is needed in order to extend the useful range of such lithium metal oxides. It is anticipated that such research will enable, in the future, useful application of lithium secondary batteries in not only energy sources for mobile communication devices and electronic devices, but also various power equipment, such as energy storage equipment for distributed generation systems, requiring high-energy density lithium secondary batteries.

Therefore, there is a demand for developing a lithium metal oxide which is for a lithium secondary battery, and which, by forming a stable interface film at or below 1 V, extends battery lifetime while enabling continuous lithium ion diffusion, and thus can achieve enhanced electrochemical properties.

DISCLOSURE OF THE INVENTION

Technical Problem

An object of the present invention is to provide a lithium metal oxide, in which the stability of an interface film formed during an electrochemical reaction of the lithium metal oxide is enhanced.

Another object of the present invention is to provide a negative electrode active material, which is for a lithium secondary battery and comprises the lithium metal oxide, and a lithium secondary battery comprising the negative electrode active material.

Still another object of the present invention is to provide a method of preparing the lithium metal oxide.

A still further object of the present invention is to provide a method, which is for preparing a negative electrode active material for a lithium secondary battery and comprises the method of preparing a lithium metal oxide.

Technical Solution

To achieve an object, the present invention provides a lithium metal oxide having the following configurations.

(1) A lithium metal oxide having a nickel oxide layer formed on a surface thereof and represented by Formula 1 below:

$$Li_xM_yO_z \qquad \text{[Formula 1]}$$

in Formula 1 above, M is at least one selected from the group consisting of Ti, Sn, Cu, Pb, Sb, Zn, Fe, In, Al, and Zr; and x, y, and z are determined according to oxidation number of M.

(2) The lithium metal oxide described in (1) above, wherein the nickel oxide layer comprises at least one selected from the group consisting of $NiO_a$, NiO, and $Ni_2O_3$, and satisfies 1<a≤1.5.

(3) The lithium metal oxide described in (1) or (2) above, wherein the nickel oxide is obtained by calcining, through a heat treatment, at least one nickel precursor selected from the group consisting of a nickel nitrate hydrate, a nickel nitrate, a nickel acetate hydrate, a nickel sulfate, and a nickel acetate.

(4) The lithium metal oxide described in any one of (1) to (3) above, wherein the nickel oxide layer has a thickness of 0.1 to 30 nm.

(5) The lithium metal oxide described in any one of (1) to (4) above, wherein the nickel oxide layer is 0.5 to 15 wt % with respect to the total weight of the lithium metal oxide.

(6) The lithium metal oxide described in any one of (1) to (5) above, wherein the lithium metal oxide is at least one selected from the group consisting of $Li_4Ti_5O_{12}$, $LiTi_2O_4$, $Li_2TiO_3$, and $Li_2Ti_3O_7$.

(7) The lithium metal oxide described in any one of (1) to (6) above, wherein the lithium metal oxide is $Li_4Ti_5O_{12}$.

Moreover, to achieve another object, the present invention provides (8) a negative electrode active material for a lithium secondary battery, the negative electrode active material comprising the lithium metal oxide described in any one of (1) to (7) above, and (9) a lithium secondary battery comprising the negative electrode active material described in (8) above.

Meanwhile, to achieve still another object, the present invention provides a method of preparing a lithium metal oxide having the following configurations.

(10) A method of preparing a lithium metal oxide having a nickel oxide layer formed on a surface thereof, the method comprising steps of: (1) complexing a nickel precursor on a surface of a lithium metal oxide; and (2) calcining, through a heat treatment, the lithium metal oxide—the surface of which is complexed with the nickel precursor—obtained in Step (1).

(11) The method of preparing a lithium metal oxide described in (10) above, wherein the nickel precursor is at least one selected from the group consisting of a nickel nitrate hydrate, a nickel nitrate, a nickel acetate hydrate, a nickel sulfate, and a nickel acetate.

(12) The method of preparing a lithium metal oxide described in (10) or (11) above, wherein the nickel precursor is used in an amount of 1 to 20 wt % with respect to the total weight of the lithium metal oxide in Step (1).

(13) The method of preparing a lithium metal oxide described in any one of (10) to (12) above, wherein the complexing in Step (1) is performed by mixing the lithium metal oxide and the nickel precursor in distilled water and stirring the mixture for 0.5 to 12 hours.

(14) The method of preparing a lithium metal oxide described in any one of (10) to (13) above, wherein the complexing in Step (1) may be performed in the presence of a complexing agent, and the complexing agent is at least one selected from the group consisting of ammonium hydroxide, ammonium fluoride, and hydrazine compounds.

(15) The method of preparing a lithium metal oxide described in any one of (10) to (14) above, wherein the nickel oxide layer comprises at least one selected from the group consisting of $NiO_a$, NiO, and $Ni_2O_3$, and a satisfies $1 < a \leq 1.5$.

(16) The method of preparing a lithium metal oxide described in any one of (10) to (15) above, wherein the heat treatment in Step (2) is performed at a temperature of 200 to 900° C.

(17) The method of preparing a lithium metal oxide described in any one of (10) to (16) above, wherein the heat treatment in Step (2) is performed under an inert gas atmosphere, and the inert gas is at least one selected from the group consisting of helium, nitrogen, argon, neon, and xenon.

(18) The method of preparing a lithium metal oxide described in any one of (10) to (17) above, wherein the lithium metal oxide is represented by Formula 1 below:

$$Li_xM_yO_z \qquad \text{[Formula 1]}$$

in Formula 1 above,

M is at least one selected from the group consisting of Ti, Sn, Cu, Pb, Sb, Zn, Fe, In, Al, and Zr; and x, y, and z are determined according to oxidation number of M.

(19) The method of preparing a lithium metal oxide described in any one of (10) to (18) above, wherein the lithium metal oxide is at least one selected from the group consisting of $Li_4Ti_5O_{12}$, $LiTi_2O_4$, $Li_2TiO_3$, and $Li_2Ti_3O_7$.

(20) The method of preparing a lithium metal oxide described in any one of (10) to (19) above, wherein the lithium metal oxide is $Li_4Ti_5O_{12}$.

In addition, to solve a still further object, the present invention provides

(21) A method of preparing a negative electrode active material for a lithium secondary battery, the method comprising the preparation method described in any one of (1) to (20) above.

Advantageous Effects

A lithium metal oxide of the present invention, which may be prepared by a lithium metal oxide preparation method of the present invention, has a nickel oxide layer formed on a surface thereof, and thus, by forming a stable solid electrolyte interface film (SEI film), may exhibit excellent electrochemical properties in a voltage range at or below 1 V, achieve a long lifetime and a high initial efficiency and output. Therefore, the lithium metal oxide may be usefully used in the manufacture of a negative electrode active material for a lithium battery and a lithium secondary battery comprising the same.

BEST MODE FOR CARRYING OUT THE INVENTION

Figure 1:
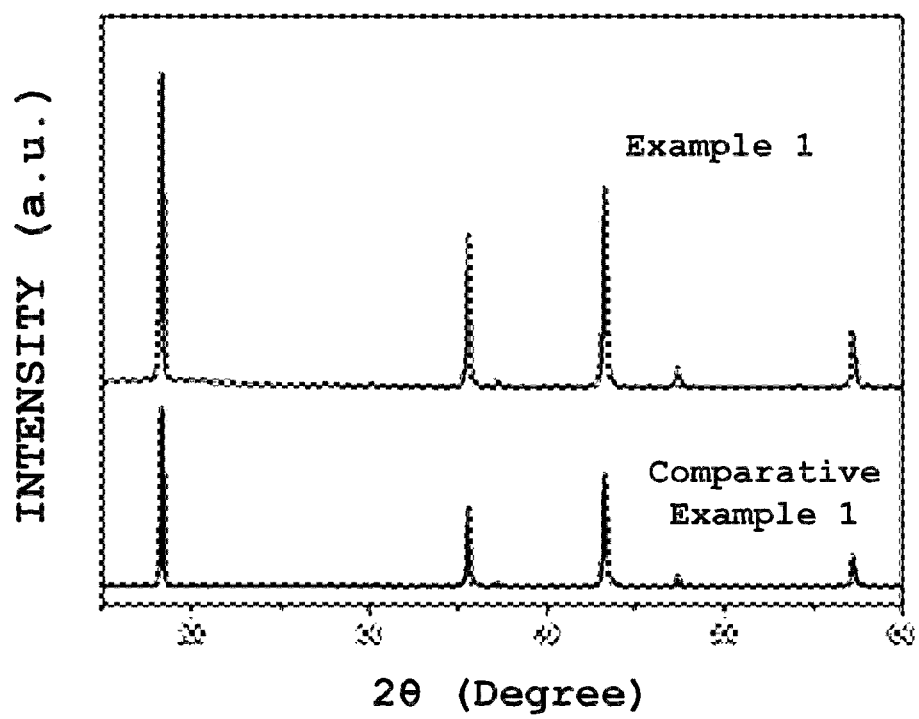
FIG. 1 is an x-ray diffraction analysis graph of a nickel oxide-coated lithium titanium oxide prepared in Example 1, and a lithium titanium oxide of Comparative Example 1.

Hereinafter, the present invention is described in greater detail in order to facilitate understanding of the present invention.

Words or terms used in the present specification and claims should not be construed as being limited to their typical or dictionary definitions. Rather, such words or terms should be understood as having meanings or concepts in accordance with the technical concept of the present invention, on the basis of the principle wherein inventors may appropriately define the words in order to best describe their invention.

A lithium metal oxide according to the present invention has a nickel oxide layer formed on a surface thereof, and may be represented by Formula 1 below.

[Formula 1]

In Formula 1 above,

M is at least one selected from the group consisting of Ti, Sn, Cu, Pb, Sb, Zn, Fe, In, Al, and Zr; and x, y, and z are determined according to oxidation number of M.

The nickel oxide layer formed on the surface of the lithium metal oxide may be a coating layer (applied layer) capable of covering all or a portion of the surface of the lithium metal oxide, and some of the components, such as nickel oxides and the like, included in the nickel oxide layer may be partially infiltrated through the surface oxide of the lithium metal oxide, and thereby form a composite with the lithium metal oxide. That is, the lithium metal oxide according to the present invention may be a nickel oxide having a nickel oxide layer formed on a surface thereof, or a lithium metal oxide composite.

The nickel oxide layer may comprise at least one nickel oxide selected from the group consisting of $NiO_a$, NiO, and $Ni_2O_3$, and may cover all or a portion of the lithium metal oxide to enable the formation of a stable interface film (SEI film), such that stable lifetime and enhanced initial efficiency and output properties are achieved.

In the specification of the present invention, "$NiO_a$" represents a nickel oxide or nickel oxide compound because that which is represented as "$NiO_a$" may be nonstoichiometric. Although Ni and O are indicated as being 1:1, an indicates that the nickel component may concurrently exist in the two oxide states of $Ni^{2+}$ and $Ni^{3+}$. For example, a may satisfy $1<a\leq1.5$, and in another instance, may satisfy $1<a<1.5$.

The nickel oxide layer may be obtained by calcining, through a heat treatment, at least one nickel precursor selected from the group consisting of a nickel nitrate hydrate, a nickel nitrate, a nickel acetate hydrate, a nickel sulfate, and a nickel acetate, and for example, may be prepared by preparing a mixture (dispersed solution) mixed by dispersing and dissolving each of the lithium metal oxide and the nickel precursor in distilled water, stirring the mixture to complex the nickel precursor onto the lithium metal oxide, and then heat treating, and thereby calcining, the same. The lithium metal oxide may be in the form of a particle. The nickel precursor may be positioned at a surface portion of the lithium metal oxide during the complexing, and may be formed on a surface of the lithium metal oxide after being transformed into the form of a nickel oxide by being calcined through the heat treatment.

The nickel precursor is not particularly limited if the nickel precursor is one that can be calcined into a nickel oxide, and for example, may be a nickel salt. Specifically, the nickel precursor may be at least one selected from the group consisting of a nickel nitrate hydrate, a nickel nitrate, a nickel acetate hydrate, a nickel sulfate, and a nickel acetate, and desirably, may be at least one selected from the group consisting of nickel nitrate hexahydrate, nickel sulfate, and nickel acetate.

The nickel oxide layer may have a thickness of 0.1 to 30 nm, desirably 0.5 to 20 nm, and more desirably 1 to 10 nm. When the thickness of the nickel oxide layer is 0.1 nm or greater, the lithium metal oxide, in which a nickel oxide layer has been formed on a surface thereof by an appropriate surface treatment effect on the lithium metal oxide, may exhibit appropriate electrochemical properties. When the thickness of the nickel oxide layer is 30 nm or less, degradation of electrochemical properties due to excessive thickness of the nickel oxide layer may be prevented.

0.5 to 15 wt %, desirably 1 to 10 wt %, and more desirably 3 to 7 wt % of the nickel oxide layer may be included with respect to the total weight of the lithium metal oxide.

In an example of the present invention, the lithium metal oxide may be a lithium titanium oxide. Specifically, the lithium metal oxide may be at least one selected from the group consisting of $Li_4Ti_5O_{12}$, $LiTi_2O_4$, $Li_2TiO_3$, and $Li_2Ti_3O_7$, and desirably, may be $Li_4Ti_5O_{12}$. Such lithium titanium oxides may be desirably used, due to having stable lifetime properties and being safe.

A lithium metal oxide having a nickel oxide layer formed on a surface thereof of the present invention may be prepared by a preparation method comprising steps of:

(1) complexing a nickel precursor on a surface of a lithium metal oxide; and (2) forming a nickel oxide layer on the surface of the lithium metal oxide by heat-treating the lithium metal oxide—the surface of which is complexed with the nickel precursor—obtained in Step (1).

(1) Step of Complexing Nickel Precursor on Surface of Lithium Metal Oxide

In Step 1, the nickel precursor may be complexed to the lithium metal oxide by preparing a mixture (dispersed solution) mixed by dispersing and dissolving the lithium metal oxide and the nickel precursor in distilled water, and stirring the mixture.

Through the complexing, the nickel precursor may be positioned on a surface portion of the lithium metal oxide.

The nickel precursor is not particularly limited if the nickel precursor is one that can generate a nickel oxide via calcination, and for example, may be a nickel salt. Specifically, the nickel precursor may be at least one selected from the group consisting of a nickel nitrate hydrate, a nickel nitrate, a nickel acetate hydrate, a nickel sulfate, and a nickel acetate, and desirably, may be at least one selected from the group consisting of nickel nitrate hexahydrate, nickel acetate, and nickel sulfate.

In Step (1), the nickel precursor may be added in an amount of 1 to 20 wt %, desirably 3 to 15 wt %, and more desirably 5 to 10 wt % with respect to the total weight of the lithium metal oxide.

When the mixed amount of the nickel precursor is 1 wt % or more, a limitation may not occur, in which a surface treatment effect becomes insignificant due to non-uniform formation of an interface film or continuous, repeated formation and dissolution of the interface film. When the mixed amount of the nickel precursor is 20 wt % or less, it is possible to prevent a stable interface film from being formed excessively thick and thus having a detrimental effect on electrochemical properties.

The mixing time may be 0.5 to 12 hours, and desirably, may be 1 to 6 hours.

The nickel precursor may be complexed to the lithium metal oxide through the mixing.

The complexing may be performed in the presence of a complexing agent, and thus, in an example of the present invention, the method of preparing a lithium metal oxide may comprise a step of introducing a complexing agent into the solution in which the lithium metal oxide and the nickel precursor are mixed.

The complexing agent may be at least one selected from the group consisting of ammonium hydroxide, ammonium fluoride, and hydrazine compounds, and desirably, may be ammonium hydroxide, ammonium fluoride, or a mixture thereof. Examples of the hydrazine compounds may comprise hydrazine, hydrazine sulfate, and hydrazine chlorate and the like.

(2) Step of forming a nickel oxide layer on the surface of the lithium metal oxide by heat-treating the lithium metal oxide—the surface of which is complexed with the nickel precursor—obtained in Step (1).

In Step (2), the lithium metal oxide, a surface of which is complexed with the nickel precursor, is heat-treated to form a nickel oxide layer on the surface of the lithium metal oxide. As a result of the heat treatment, the nickel precursor complexed onto the surface of the lithium metal oxide may transform into a nickel oxide by being calcined.

The nickel oxide layer, on the surface of the lithium metal oxide and formed as such, may enable the formation of a stable interface film (SEI film) on the surface of the lithium metal oxide, and therefore, may enable a lithium metal oxide having the nickel oxide layer formed on a surface thereof according to an example of the present invention to exhibit stable lifetime and enhanced initial efficiency and output properties. For example, when used in a lithium secondary battery, the nickel oxide layer—due to a catalytic action of the nickel oxide formed on the surface of the lithium metal oxide—may enable $Li_2O$ to be formed by decomposing lithium carbonate ($Li_2CO_3$) among electrolyte components decomposed during charging, particularly at low voltages of at most 1 V, may facilitate stable interface film formation at up to 0.01 V, and may suppress further formation of lithium carbonate, and thus may provide a lifetime enhancing effect to the lithium secondary battery.

The nickel oxide layer may comprise at least one selected from the group consisting of $NiO_a$, $NiO$, and $Ni_2O_3$. 0.5 to 15 wt %, desirably 1 to 10 wt %, and more desirably 3 to 7 wt % of the nickel oxide layer may be included with respect to the total weight of the lithium metal oxide.

The heat treatment temperature for calcination may be 200 to 900° C., desirably 250 to 800° C., and more desirably 300 to 600° C.

When the heat treatment temperature is 200° C. or higher, removal of impurities is appropriately achieved, and thus side reactions—which occur during an electrochemical reaction and are caused by impurities that may be included in the nickel oxide layer—may be prevented, and when the heat treatment temperature is 900° C. of lower, coarsening of particles may be prevented.

The heat treatment may be performed under an inert gas atmosphere, and the inert gas may be at least one selected from the group consisting of helium, nitrogen, argon, neon, and xenon.

The lithium metal oxide—which is prepared through the method comprising Steps (1) and (2) and in which a nickel oxide layer is formed on the surface—when compared to the lithium metal oxide prior to formation of the nickel oxide layer on the surface, may be one in which the shape and size of particles do not change and electrochemical properties are enhanced in the absence of changes in the shape and size of the particles.

In an example of the present invention, the lithium metal oxide may be a lithium metal oxide represented by Formula 1 below.

$$Li_xM_yO_z \qquad \text{[Formula 1]}$$

In Formula 1 above,

M is at least one selected from the group consisting of Ti, Sn, Cu, Pb, Sb, Zn, Fe, In, Al, and Zr; and x, y, and z are determined according to oxidation number of M.

In an example of the present invention, the lithium metal oxide, in view of charge/discharge properties and lifetime properties required as a negative electrode active material, may be a lithium titanium oxide. Specifically, the lithium metal oxide may be at least one selected from the group consisting of $Li_4Ti_5O_{12}$, $LiTi_2O_4$, $Li_2TiO_3$, and $Li_2Ti_3O_7$, and desirably, may be $Li_4Ti_5O_{12}$. A lithium titanium oxide such as above has stable lifetime properties and is stable, and thus may be desirably used.

A lithium metal oxide prepared according to an example of a method of preparing a lithium metal oxide of the present invention may be used as a negative electrode active material for a lithium secondary battery, and a negative electrode may be manufactured using the same.

Thus, the present invention provides a method of preparing a negative electrode active material for a lithium secondary battery, wherein the method comprises the lithium metal oxide preparation method of the present invention. In addition, the present invention provides a negative electrode active material which is for a lithium secondary battery and comprises the lithium metal oxide, and provides a lithium secondary battery comprising the same. The lithium secondary battery may comprise a positive electrode, a negative electrode, and a separator interposed between the positive electrode and the negative electrode.

The negative electrode may be prepared by mixing and stirring the negative electrode active material and additives, such as a binder and a conductive material, to prepare a negative electrode active material slurry, and coating and drying—and then compressing—the negative electrode active material slurry on a negative electrode current collector.

The binder is not particularly limited if the binder is a typical binder used when preparing a slurry for a negative electrode active material. For example, polyvinyl alcohol, carboxymethylcellulose, hydroxypropyl cellulose, diacetyl cellulose, polyvinyl chloride, polyvinyl pyrrolidone, polytetrafluoroethylene, polyvinylidene fluoride (PVdF), polyethylene, or polypropylene and the like, which are non-aqueous binders, may be used, and one or a mixture of two or more selected from the group consisting of acrylonitrile-butadiene rubber, styrene-butadiene rubber, and acrylic rubber, which are aqueous binders, may be used.

10 wt % or less, specifically 0.1 to 10 wt %, of the binder may be included with respect to the total weight of a slurry for a negative electrode active material. When the binder content is less than 0.1 wt %, it is undesirable because the effect of using the binder is negligible. When the binder content exceeds 10 wt %, it is undesirable because there is a concern that the relative decrease in the active material content due to the increase in the binder content can result in a decrease in per-volume capacity.

The conductive material is not particularly limited if the conductive material is one that exhibits conductivity and does not cause chemical changes to the battery. Examples of the conductive material may comprise graphites, such as natural graphite or synthetic graphite; carbon blacks, such as acetylene black, Ketjen black, channel black, furnace black, lamp black, or thermal black; conductive fibers, such as carbon fiber or metal fiber; metal powders, such as fluorocarbon, aluminum, or nickel powder; conductive whiskers, such as zinc oxide or potassium titanate; conductive metal oxides, such as titanium oxide; and conductive substances, such as a polyphenylene derivative. The amount of the conductive material used may be 1 to 9 wt % of the total weight of a slurry for a negative electrode active material.

A negative electrode current collector used in the negative electrode according to an embodiment of the present invention may have a thickness of 3 to 500 μm. The negative electrode current collector is not particularly limited if the negative electrode current collector exhibits conductivity and does not cause chemical changes in the battery. For example, copper, stainless steel, aluminum, nickel, titanium, baked carbon, copper or stainless steel surface-treated with carbon, nickel, titanium, or silver and the like, or an aluminum-cadmium alloy, etc. may be used. In addition, fine protrusion and recesses may be formed on the surface to strengthen the adhesiveness to a negative electrode active material may also be strengthened by forming fine protrusions and recesses on the surface, and the negative electrode current collector may be used in various forms, such as a film, a sheet, a foil, a net, a porous body, a foam, or a non-woven fabric and the like.

The positive electrode may be manufactured according to typical methods known in the field. For example, the positive electrode may be manufactured by mixing and stirring a positive electrode active material, a solvent, and, as needed, a binder, a conductive material, and a dispersant, to prepare a slurry, and then drying the slurry after applying (coating) and compressing the same on a metal current collector made of a metal material.

The metal current collector is not particularly limited if the metal current collector, being a highly conductive metal to which the positive electrode active material can easily adhere, does not cause chemical changes to the battery in the voltage range of the battery, and at the same time, has high conductivity. For example, stainless steel, aluminum, nickel, titanium, baked carbon, or aluminum or stainless steel surface-treated with carbon, nickel, titanium, or silver and the like may be used. In addition, fine protrusion and recesses may be formed on the surface of the current collector to strengthen the adhesiveness to a positive electrode active material. The current collector may be used in various forms, such as a film, a sheet, a foil, a net, a porous body, a foam, or a non-woven fabric and the like, and may have a thickness of 3 to 500 μm.

The positive electrode active material, for example, may be a layered compound, such as compound lithium cobalt oxide ($LiCoO_2$) or lithium nickel oxide ($LiNiO_2$), or a compound substituted with additional transition metals; a lithium manganese oxide of formula $Li_{1+x}Mn_{2-x}O_4$ (where x is 0 to 0.33), $LiMnO_3$, $LiMn_2O_3$, or $LiMnO_2$; lithium copper oxide ($Li_2CuO_2$), a vanadium oxide, such as $LiV_3O_8$, $LiFe_3O_4$, $V_2O_5$, or $Cu_2V_2O_7$; a Ni site-type lithium nickel oxide represented by formula $LiNi_{1-x}M_xO_2$ (where M=Co, Mn, Al, Cu, Fe, Mg, B, or Ga, and x=0.01 to 0.3); a lithium manganese composite oxide represented by formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); $LiMn_2O_4$, in which some of Li in the formula are substituted with alkaline earth ions; a disulfide compound; or $Fe_2(MoO_4)_3$ and the like.

Solvents for forming the positive electrode may comprise organic solvents, such as n-methyl pyrrolidone (NMP), dimethylformamide (DMF), acetone, or dimethyl acetamide, or water and the like, and such solvents may be used alone or two or more such solvents may be used after being mixed. The amount of solvent used is sufficient if the amount of solvent can dissolve and disperse the positive electrode active material, a binder, and a conductive material, taking into consideration the coating thickness of a slurry and manufacturing yield.

Various kinds of binder polymers, such as polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinyl pyrrolidone, tetrafluoroethylene, polyethylene, polypropylene, polyacrylic acid, ethylene-propylene-diene monomers (EPDM), sulfonated EPDM, styrene butadiene rubber (SBR), fluorine rubber, polyacrylic acid, and polymers or various copolymers in which hydrogen thereof is substituted by Li, Na, Ca, or the like, may be used as the binder.

The conductive material is not particularly limited if the conductive material is one that exhibits conductivity and does not cause chemical changes to the battery. For example, graphites, such as natural graphite or synthetic graphite; carbon blacks, such as acetylene black, Ketjen black, channel black, furnace black, lamp black, or thermal black; conductive fibers, such as carbon fiber or metal fiber; conductive tubes, such as a carbon nano-tube; metal powders, such as fluorocarbon, aluminum, or nickel powder; conductive whiskers, such as zinc oxide or potassium titanate; conductive metal oxides, such as titanium oxide; and conductive substances, such as a polyphenylene derivative may be used. The conductive material may be used in an amount of 1 to 20 wt % with respect to the total weight of a positive electrode slurry.

An aqueous dispersant or an organic dispersant such as N-methyl-2-pyrrolidone may be used as the dispersant.

In addition, as the separator, a general porous polymer film conventionally used as a separator, for example, a porous polymer film prepared by polyolefin polymers, such as ethylene homopolymers, propylene homopolymer, ethylene-butene copolymers, ethylene-hexene copolymers, and ethylene-methacrylate copolymers, may be independently used or used by being laminated, or a general porous non-woven fabric, for example, a non-woven fabric made of high melting point glass fiber, polyethylene terephthalate fiber, and the like may be used, but the separator is not limited thereto.

Those which may be generally used for electrolytes for a lithium secondary battery may be used without limitation as lithium salts which may be included as electrolytes used in the present invention. For example, anions of the lithium salts may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Electrolytes used in the present invention may comprise organic liquid electrolytes, inorganic liquid electrolytes, solid polymer electrolytes, gel-type polymer electrolytes, solid inorganic electrolytes, or dissolving-type inorganic electrolytes which may be used when preparing a lithium secondary battery, but are not limited thereto.

The outer appearance of the lithium secondary battery of the present invention is not particularly limited, and may be a cylindrical type using a can, an angular type, a pouch type, or a coin type and the like.

The lithium secondary battery according to the present invention may be used for a battery cell used as a power source of a small device, and may also be desirably used as a unit battery for a medium or large size battery module comprising multiple battery cells.

Desirable examples of a medium or large size device may be an electric vehicle, a hybrid electric vehicle, a plug-in hybrid electric vehicle, and an electricity storage system, but are not limited thereto.

MODE FOR CARRYING OUT THE INVENTION

Examples

Hereinafter, descriptions are made in more detail with respect to Examples and Experiment Examples to specifically explain the present invention, but the preset invention is not limited by Examples and Experimental Examples. Examples according to the present invention may vary in different forms and should not be constructed as limited to the embodiments set forth herein. Examples are provided to more completely explain the present invention to those skilled in the art.

Example 1

A homogeneous solution was prepared by mixing 50 ml of distilled water with 0.05 g of nickel (II) nitrate hexahydrate. 0.5 g of lithium titanium oxide ($Li_4Ti_5O_{12}$) was added thereto and stirred for 2 hours to obtain a uniform mixed solution comprising a complex in which nickel (II) nitrate hexahydrate is complexed on a surface of the lithium titanium oxide ($Li_4Ti_5O_{12}$).

The homogeneous mixed solution was heat-treated under an inert gas atmosphere of Ar at 500° C. for 2 hours to prepare a lithium titanium oxide, a surface of which was coated with a nickel oxide ($NiO_a$).

Comparative Example 1

The lithium titanium oxide ($Li_4Ti_5O_{12}$) used in Example 1 was used as Comparative Example 1 while a nickel oxide layer was not formed.

Example 2

Preparation of Coin-Type Half-Cells

A slurry was prepared by mixing the lithium titanium oxide having a surface coated with a nickel oxide and prepared in Example 1, as a negative electrode active material, carbon, as a conductive material, and polyvinylidene fluoride (PVdF), as a binder, at a weight ratio of 90:3:7 and by mixing the mixture with N-methyl pyrrolidone, which is a solvent. A negative electrode was prepared by coating the prepared slurry on one surface of a copper collector at a thickness of 180 μm, rolling the slurry, and drying the slurry for 6 or more hours in a vacuum oven of 120° C.

An electrochemical cell was prepared by using the prepared negative electrode. A lithium metal foil was used as a counter electrode.

1 M of a $LiPF_6$ non-aqueous electrolyte was prepared as an electrolyte by adding $LiPF_6$ to a non-aqueous electrolyte solvent prepared by mixing ethylene carbonate and diethyl carbonate at a volume ratio of 1:1, and then coin-type half-cells were prepared in a glove box of an argon atmosphere.

Comparative Example 2

Preparation of Coin-Type Half-Cells

Coin-type half cells were prepared through the same method as in Example 1, except for using the lithium titanium oxide of Comparative Example 1 instead of the lithium titanium oxide having a surface coated with a nickel oxide which was prepared as a negative active material in Example 1.

Experimental Example 1

X-Ray Diffraction Analysis

An x-ray diffraction analysis [XRD, Rigaku, D/MAX-2500(18 kW)] was performed by using CuKα radiation with respect to each of the lithium titanium oxide having a surface coated with a nickel oxide of Example 1 and the lithium titanium oxide of Comparative Example 1, and results therefrom were shown in FIG. 1.

Referring to FIG. 1, it can be found that both the lithium titanium oxide having a surface coated with a nickel oxide of Example 1 and the lithium titanium oxide of Comparative Example 1 show characteristic peaks corresponding to a spinel without having impurities.

However, as for the lithium titanium oxide having a surface coated with a nickel oxide and prepared according to Example 1, since the amount of the nickel oxide coated on the surface of the lithium titanium oxide is small, it could be confirmed that the lithium titanium oxide was not shown as a peak and a new composition of impurities was not formed.

Experimental Example 2

SEM Image

Figure 2:
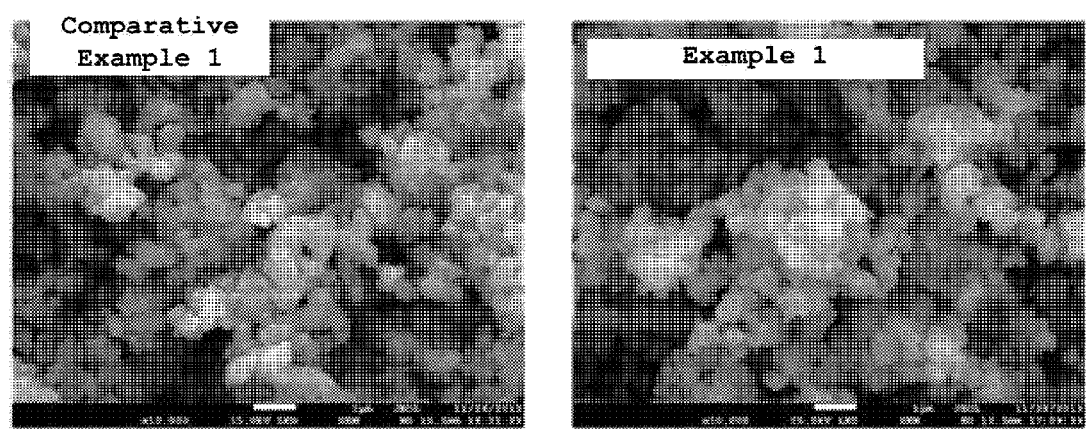
FIG. 2 is a scanning electron microscope (SEM) image of a nickel oxide-coated lithium titanium oxide prepared in Example 1, and a lithium titanium oxide of Comparative Example 1.

Images were photographed for each of the lithium titanium oxide having a surface coated with a nickel oxide of Example 1 and the lithium titanium oxide of Comparative Example 1 by using a scanning electron microscope (SEM), and results therefrom were shown in FIG. 2.

As confirmed through FIG. 2, it can be found that the shape and the particle size of the lithium titanium oxide having a surface coated with a nickel oxide and prepared according to Example 1 are similar to those of the lithium titanium oxide, a surface of which was not treated, of Comparative Example 1.

Through Experimental Examples 1 and 2, it could be confirmed that the shape and the particle size of the lithium titanium oxide having a surface coated with a nickel oxide, which was prepared according to Example 1 were not changed by surface coating of the nickel oxide. In addition, from the results, it could be confirmed that electrochemical properties were not improved by changes in the shape and size of particles of the lithium titanium oxide having a surface coated with a nickel oxide, which was prepared according to Example 1.

Experimental Example 3

TEM Image

Figure 3:
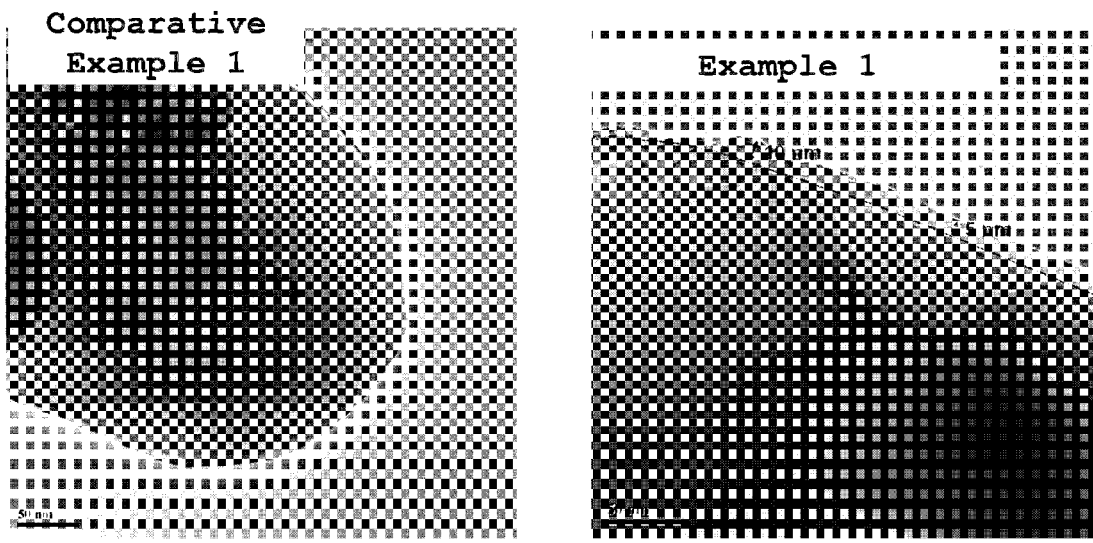
FIG. 3 is a transmission electron microscope (TEM) image of a nickel oxide-coated lithium titanium oxide prepared in Example 1, and a lithium titanium oxide of Comparative Example 1.

Transmission electron microscope (TEM) images of each of the lithium titanium oxide coated with a nickel oxide of Example 1 and the lithium titanium oxide of Comparative Example 1 were obtained and shown in FIG. 3. Referring to FIG. 3, as for the lithium titanium oxide having a surface coated with a nickel oxide, which was prepared in Example 1, it could be confirmed that a nickel oxide was coated on the surface of a nickel oxide, and it was confirmed that the thickness thereof was approximately 5 to 10 nm.

Experimental Example 4

Evaluation of Electrochemical Properties

To confirm relative efficiency in accordance with the number of cycles with respect to the half-cells respectively in Example 2 and Comparative Example 2, an electrochemical evaluation test was performed as follows.

Figure 4:
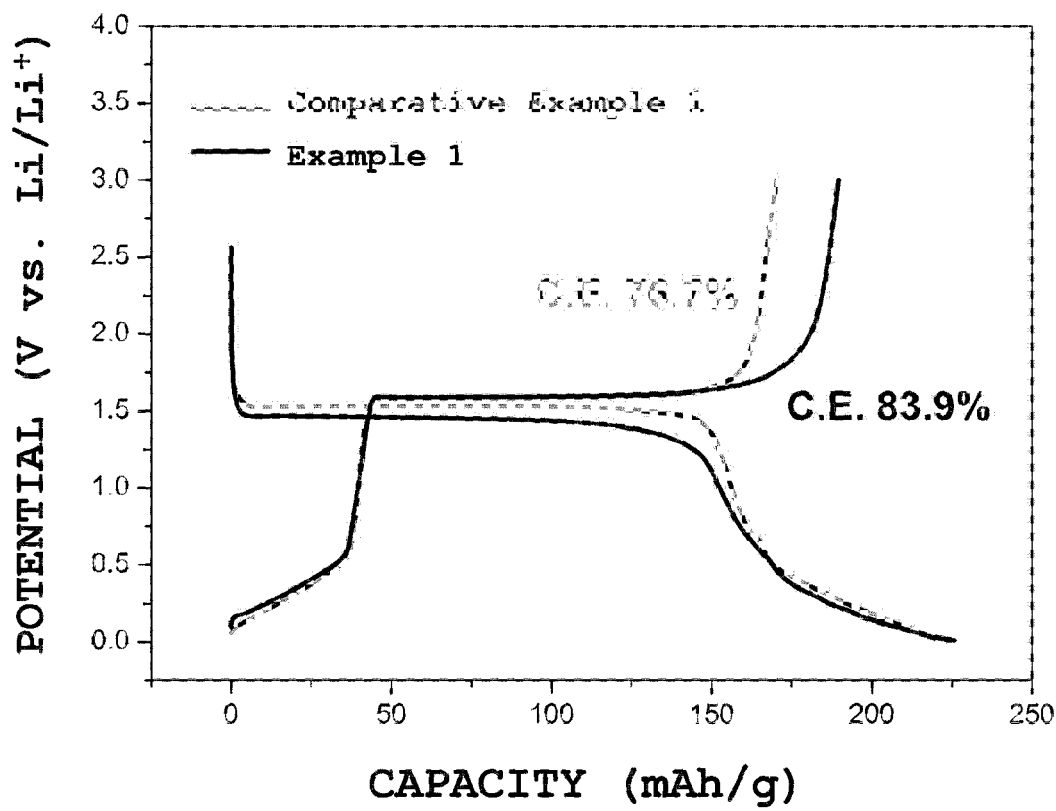
FIG. 4 is a graph displaying results of measuring charge/discharge properties of each of half-cells manufactured in Example 2 and Comparative Example 2, respectively, after charging and discharging the half-cells at 0.01 to 3 V and 0.1 C.

Potential difference properties versus Li/Li$^+$ were measured by charging/discharging each of the half-cells at 0.01 to 3 V and 0.1 C, and results therefrom were shown in FIG. 4. In addition, discharge capacity and Coulomb efficiency were measured after performing 50 charge/discharge cycles at 0.01 to 3 V and 0.1 C, and results therefrom were shown in FIG. 5.

Referring to FIG. 4, a nickel oxide-coated lithium titanium oxide composite of Example 1 shows oxidation/reduction reactions similar to those of the lithium titanium oxide of Comparative Example 1. A potential even section corresponding to Ti$^{3+/4+}$ in a 1.5 V section is shown, but the nickel oxide-coated lithium titanium oxide composite of Example 1 shows charge efficiency (C.E.) of 83.9% due to interface film stabilization during initial charging and discharging. Therefore, it can be confirmed that initial efficiency in Example 1 increases compared to the lithium titanium oxide of Comparative Example 1 showing charge efficiency of 76.7%.

Figure 5:
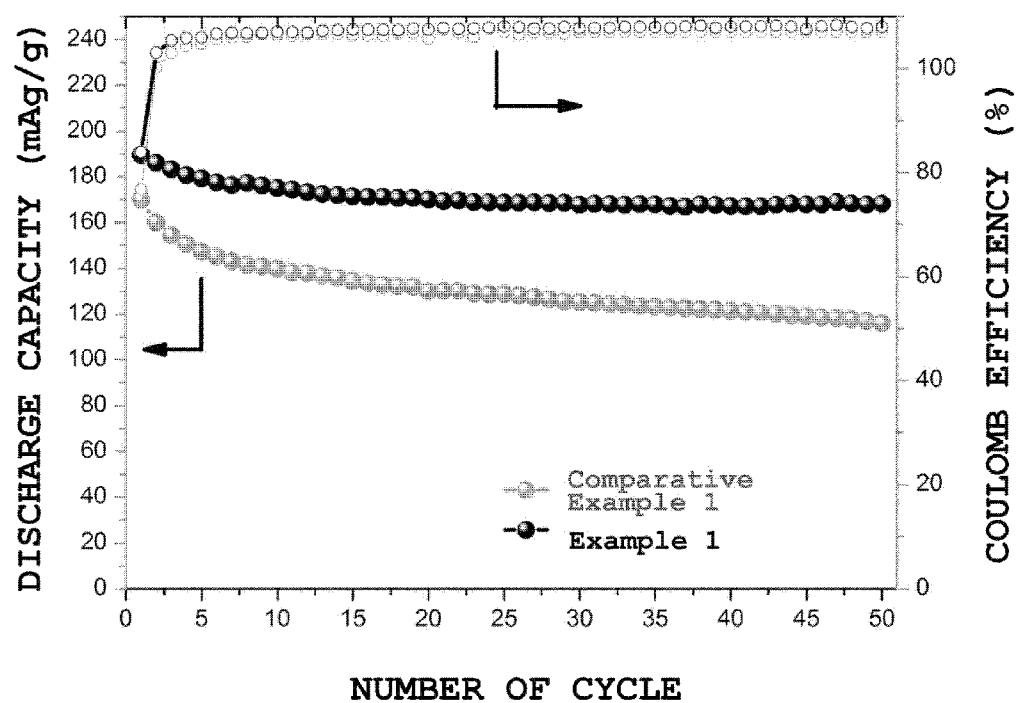
FIG. 5 is a graph displaying results of measuring charge/discharge properties of each of half-cells manufactured in Example 2 and Comparative Example 2, respectively, after performing 50 charge/discharge cycles on the half-cells at 0.01 to 3 V and 0.1 C.

Also, referring to FIG. 5, as for the half-cells of Comparative Example 2 using the lithium titanium oxide of Comparative Example 1 as a negative electrode active material, a lifetime is reduced due to a loss of capacity as continuous formation and decomposition of an interface film is repeated. In contrast, it can be confirmed that a lifetime is maintained even after 50 charge/discharge cycles in the half-cells of Example 2 using the nickel oxide-coated lithium titanium oxide of Example 1 as a negative electrode active material.

Figure 6:
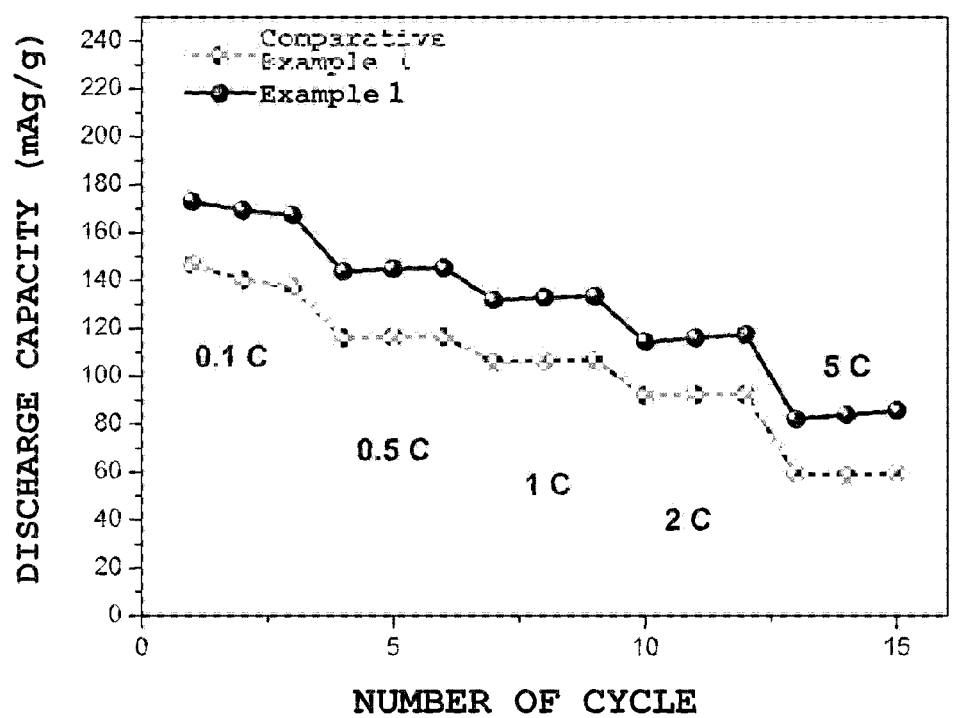
FIG. 6 is a graph displaying results of measuring charge/discharge properties of each of half-cells manufactured in Example 2 and Comparative Example 2, respectively, after charging and discharging the half-cells at 0.01 to 3 V and 0.1, 0.5, 1, 2, and 5 C.

Meanwhile, FIG. 6 shows evaluation results of rate limiting properties to confirm changes in discharge capacity according to changes in current densities of the half-cells of Example 2 and Comparative Example 2, and specifically shows results of measuring discharge capacity of each of half-cells of Example 2 and Comparative Example 2, respectively, after charging and discharging the half-cells of Example 2 and Comparative Example 2 at 0.01 to 3 V and 0.1, 0.5, 1, 2, and 5 C.

Referring to FIG. 6, since the half-cells of Example 2 comprise the nickel oxide-coated lithium titanium oxide prepared in Example 1 as a negative electrode active material, the half-cells of Example 2 show higher discharge capacity than the half-cells of Comparative Example 2 under overall current density conditions. In particular, it can be confirmed that the half-cells of Example 2 show higher capacity than the half-cells of Comparative Example 2 at high current density of 5 C.

From the results, it can be confirmed that in a lithium secondary battery comprising a nickel oxide-coated lithium titanium oxide according to the present invention, ion conductivity is improved as electronic conductivity is improved and a stable interface film is formed by a nickel oxide existing on a surface thereof, and thus it can be known that the nickel oxide-coated lithium titanium oxide is suitable as a negative electrode material of a lithium secondary battery requiring high energy densities and high-speed charging and discharging.

Experimental Example 5

Infrared Spectroscopy Analysis

Figure 7:
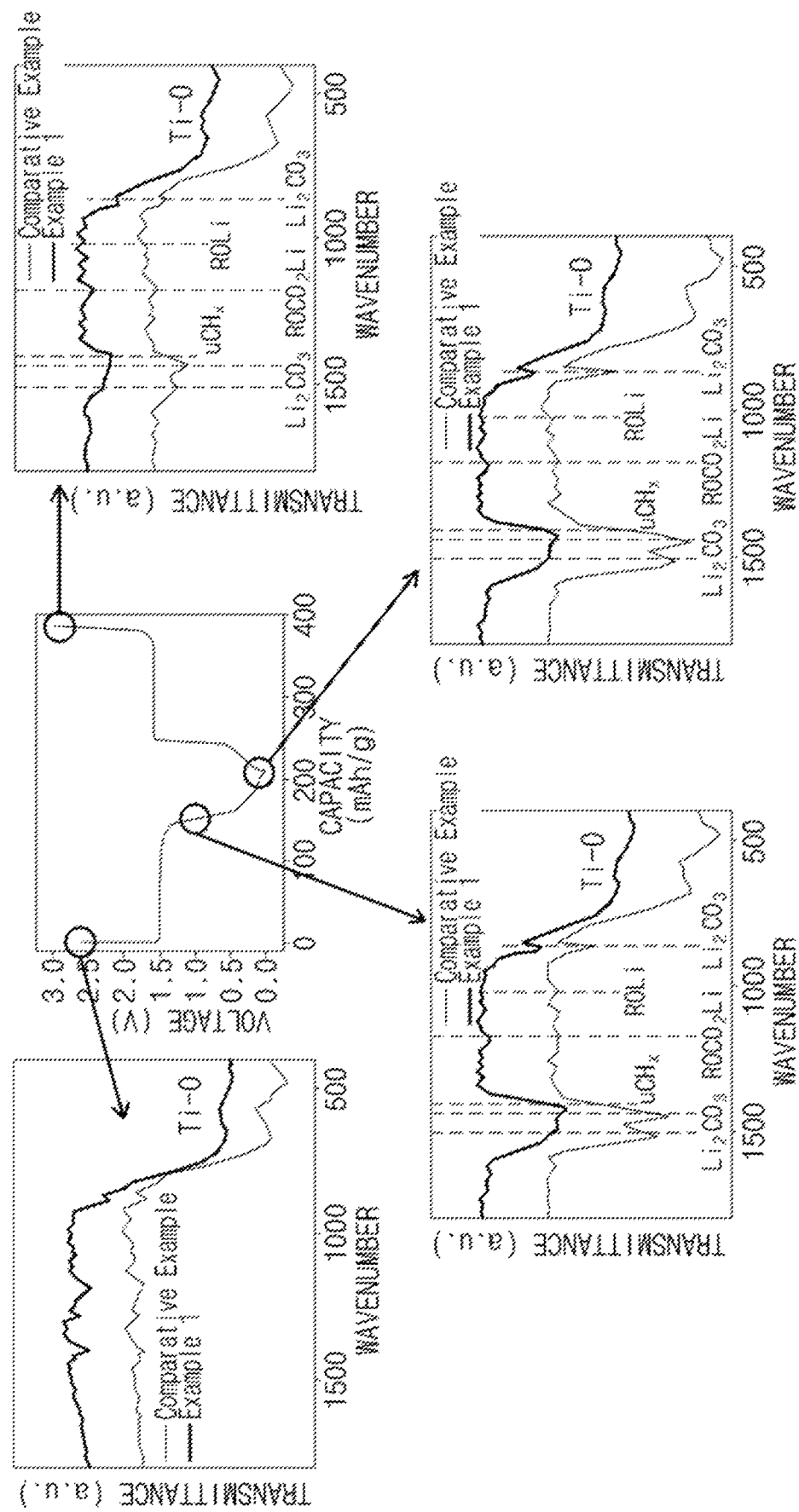
FIG. 7 is an infrared spectroscopy graph according to depth of charge/discharge, obtained by varying charge/discharge depth when charging/discharging each of half-cells manufactured in Example 2 and Comparative Example 2 at 0.01 to 3 V and 0.1 C.

An infrared spectroscopy graph for analyzing an interface film according to state of charge of the lithium titanium oxides of Example 1 and Comparative Example 1 was shown in FIG. 7.

Referring to FIG. 7, it can be confirmed that solid electrolyte interfaces (SEIs) are formed of the same components in both Example 1 and Comparative Example 1. However, as for the lithium titanium oxide having a surface coated with a nickel oxide of Example 1, in a 400-600 cm$^{-1}$ region which is a low wavenumber region, it is determined that a peak is weakly shown as vibrations of Ni—O of the nickel oxide coated on the surface thereof and Ti—O of the lithium titanium oxide overlap. Therefore, existence of a nickel oxide coated on a surface could be confirmed in the lithium titanium oxide having a surface coated with a nickel oxide and prepared in Example 1.

Experimental Example 6

X-Ray Photoelectron Spectroscopy Analysis

Figure 8:
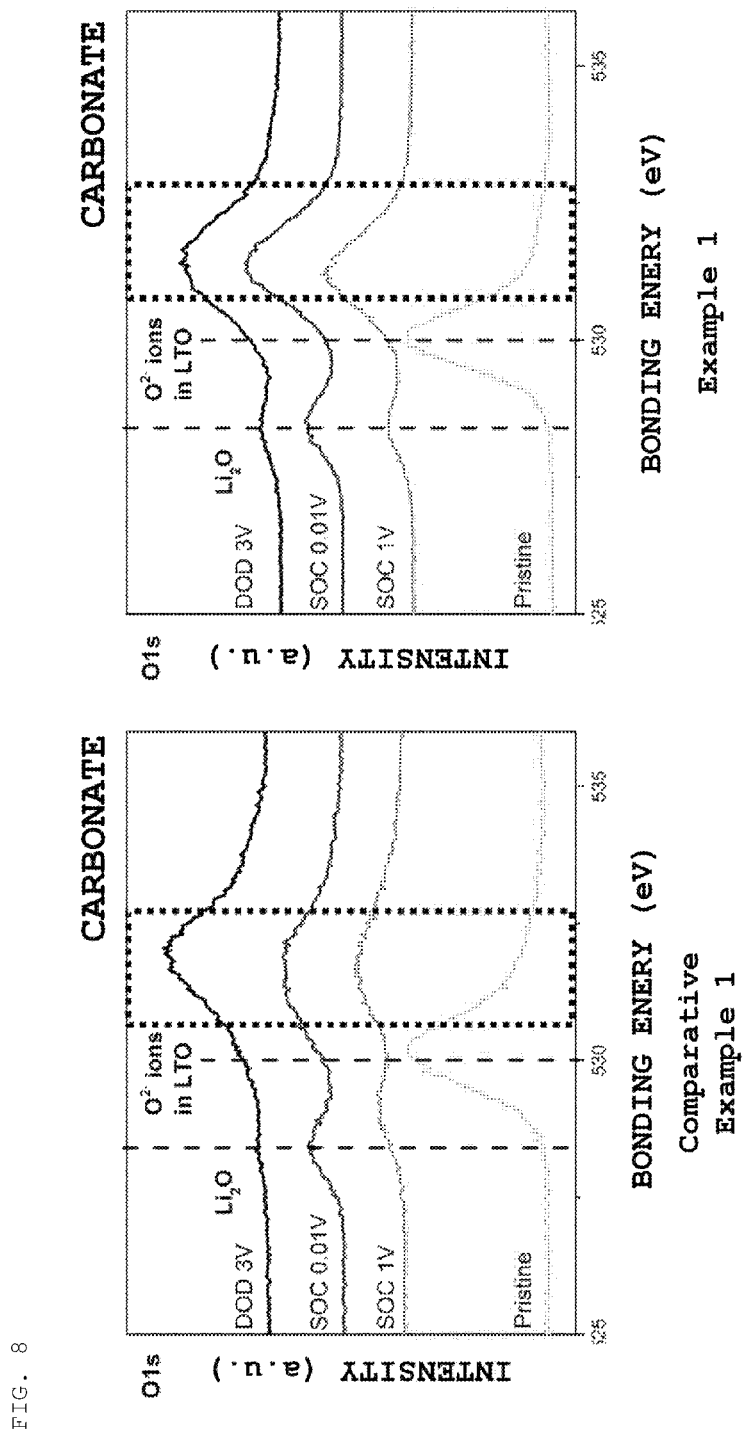
FIG. 8 is an O1s x-ray photoelectron spectroscopy graph according to depth of charge/discharge, obtained by varying charge/discharge depth when charging/discharging each of half-cells manufactured in Example 2 and Comparative Example 2 at 0.01 to 3 V and 0.1 C.

An x-ray photoelectron spectroscopy graph for analyzing solid electrolyte interfaces according to state of charge of the lithium titanium oxides of Example 1 and Comparative Example 1 was shown in FIG. 8.

Referring to FIG. 8, it could be confirmed that solid electrolyte interfaces were formed of the same components in both Example 1 and Comparative Example 1. However, as for the nickel oxide-coated lithium titanium oxide prepared in Example 1, it could be confirmed that lithium carbonate (Li$_2$CO$_3$) was decomposed during charging (1 V)

dues to a catalytic action of the nickel oxide existing in the surface thereof, so that $Li_2O$ is formed. In addition, when considering that the nickel oxide-coated lithium titanium oxide helps stable formation of a solid electrolyte interface at up to 0.01 V and suppresses further formation of lithium carbonate, it is determined that the nickel oxide-coated lithium titanium oxide is closely related to a lifetime.

From the results, the nickel oxide-coated lithium titanium oxide prepared in Example 1 according to an embodiment of the present invention could be determined to be able to maintain a stable lifetime even at 1 V or less due to stable formation of a solid electrolyte interface, and it could be confirmed that the nickel oxide-coated lithium titanium oxide was suitable as a negative electrode material of a lithium secondary battery requiring high energy densities and high-speed charging and discharging.

The invention claimed is:

1. A method of preparing a lithium metal oxide having a nickel oxide layer formed on a surface thereof, the method comprising:
   (1) complexing a nickel precursor on a surface of a lithium metal oxide;
   (2) calcining, through a heat treatment, the lithium metal oxide—the surface of which is complexed with the nickel precursor—obtained in step (1) to form the nickel oxide layer on the surface of the lithium metal oxide;
   wherein the nickel oxide layer is partially infiltrated through the surface of the lithium metal oxide,
   wherein the nickel precursor is at least one selected from the group consisting of a nickel nitrate hydrate, a nickel nitrate, a nickel acetate hydrate, a nickel sulfate, and a nickel acetate,
   wherein the lithium metal oxide is at least one selected from the group consisting of $Li_4Ti_5O_{12}$, $LiTi_2O_4$, $Li_2TiO_3$, and $Li_2Ti_3O_7$.

2. The method of claim 1, wherein the nickel precursor is used in an amount of 1 to 20 wt % with respect to a total weight of the lithium metal oxide in step (1).

3. The method of claim 1, wherein the complexing in step (1) is performed by mixing the lithium metal oxide and the nickel precursor in distilled water to form a mixture and stirring the mixture for 0.5 to 12 hours.

4. The method of claim 1, wherein the complexing in step (1) is able to be performed in presence of a complexing agent, and the complexing agent is at least one selected from the group consisting of ammonium hydroxide, ammonium fluoride, and hydrazine compounds.

5. The method of claim 1, wherein the nickel oxide layer comprises at least one selected from the group consisting of $NiO_a$, $NiO$, and $Ni_2O_3$, and a satisfies $1<a\leq1.5$.

6. The method of claim 1, wherein the heat treatment in step (2) is performed at a temperature of 200 to 900° C.

7. The method of claim 1, wherein the heat treatment in step (2) is performed under an inert gas atmosphere, and the inert gas is at least one selected from the group consisting of helium, nitrogen, argon, neon, and xenon.

8. A method of preparing a negative electrode active material for a lithium secondary battery comprising the method of claim 1.

* * * * *